US010232795B2

(12) United States Patent
Song

(10) Patent No.: US 10,232,795 B2
(45) Date of Patent: Mar. 19, 2019

(54) ONE TOUCH TYPE SUPPORTING HOLDER

(71) Applicant: CPC Co., Ltd., Hwaseong-si, Gyeonggi-do (KR)

(72) Inventor: Soon Young Song, Anyang-si (KR)

(73) Assignee: CPC Co., Ltd., Hwaseong-si, Gyeonggi-do (KR)

( * ) Notice: Subject to any disclaimer, the term of this patent is extended or adjusted under 35 U.S.C. 154(b) by 0 days.

(21) Appl. No.: 15/823,585

(22) Filed: Nov. 28, 2017

(65) Prior Publication Data

US 2019/0031112 A1    Jan. 31, 2019

(30) Foreign Application Priority Data

Jul. 26, 2017    (KR) .......................... 10-2017-0094748

(51) Int. Cl.
*B60R 11/02*    (2006.01)
*H04M 1/04*    (2006.01)
*B60R 11/00*    (2006.01)

(52) U.S. Cl.
CPC ...... *B60R 11/0241* (2013.01); *B60R 11/0235* (2013.01); *H04M 1/04* (2013.01); *B60R 2011/008* (2013.01); *B60R 2011/0075* (2013.01)

(58) Field of Classification Search
CPC ............. B06R 11/0241; B06R 11/0235; B06R 2011/008; B06R 2011/0075; H04M 1/04
USPC ....................................................... 455/575.9
See application file for complete search history.

(56) References Cited

U.S. PATENT DOCUMENTS 5,832,082 A * 11/1998 Nagai ................. B60R 11/0241
379/449

* cited by examiner

*Primary Examiner* — Eugene Yun
(74) *Attorney, Agent, or Firm* — Revolution IP, PLLC

(57) ABSTRACT

A one-touch type supporting holder includes a support body which includes one pair of openings opened in directions opposite to each other; one pair of grip units which are respectively inserted in the one pair of openings and slidably movably coupled to the support body in directions opposite to each other; a one-touch reciprocating unit which is slidably movably coupled to a front of the support body, and slides and moves in the support body to make the grip units to slide and move to mount the electronic apparatus; a one-touch elastic member which elastically supports the one-touch reciprocating unit against the support body; and a one-touch guide unit which controls a sliding movement state of the grip unit in the support body.

3 Claims, 9 Drawing Sheets

ONE TOUCH TYPE SUPPORTING HOLDER

CROSS-REFERENCE TO RELATED APPLICATION

This application claims priority from Korean Patent Application No. 10-2017-0094748, filed on Jul. 26, 2017 in the Korean Intellectual Property Office, the disclosure of which is incorporated herein by reference.

BACKGROUND OF THE INVENTION (a) Field of the Invention

The present disclosure relates to a one-touch type supporting holder, and more particularly to a one-touch type supporting holder which is not only in a standby state for gripping an electronic apparatus but also convenient to hold the electronic apparatus by one touch.

(b) Description of the Related Art

In general, with recent development of mobile phones, there has been widespread a smart phone that various functions such as moving picture playing, Internet searching, global positioning system, etc. are integrated into the mobile phone.

To use the smart phone for the moving picture playing, the Internet searching, the global positioning system, etc., the smart phone has to be stationarily mounted with its screen facing toward a user. However, the smart phone and its case according to the related art have a restricted function to stationarily mount the smart phone.

Further, a vehicle holder for mounting the smart phone to a vehicle has a structure of employing a magnet, to which only a back of a battery for the smart phone is attached, without a structure for gripping the smart phone. Therefore, the smart phone is likely to be separated from the holder or moved from the position by a shock caused when a vehicle is driven along a bumpy or winding road. Besides, the magnetic field emitted from the magnet may interfere with hands-free communication of the smart phone.

SUMMARY OF THE INVENTION

Accordingly, the present disclosure is conceived to solve the foregoing problems, and an aspect of the present disclosure is to provide a one-touch type supporting holder which is not only in a standby state for gripping an electronic apparatus but also convenient to hold the electronic apparatus by one touch.

In accordance with an embodiment of the present disclosure, there is provided a one-touch type supporting holder including: a support body which includes one pair of openings opened in directions opposite to each other; one pair of grip units which are respectively inserted in the one pair of openings and slidably movably coupled to the support body in directions opposite to each other; a one-touch reciprocating unit which is slidably movably coupled to a front of the support body, and slides and moves in the support body to make the grip units to slide and move to mount the electronic apparatus; a one-touch elastic member which elastically supports the one-touch reciprocating unit against the support body; and a one-touch guide unit which controls a sliding movement state of the grip unit in the support body.

The grip unit may include a first grip slider on which grip saw-teeth are arranged along a sliding direction of the grip unit; a second grip slider which is slidably movably coupled to the first grip slider; a grip elastic member which elastically supports the second grip slider against the first grip slider; and a grip wing which protrudes from one end portion of the second grip slider toward the front of the support body, and one of the first grip slider and the second grip slider is slidably movably coupled to the support body.

The one-touch reciprocating unit may include a device mounting bracket which is arranged in the front of the support body and mounts the electronic apparatus thereto; an elastic support bracket which is coupled to the device mounting bracket and elastically supports the one-touch elastic member; a rack gear which protrudes from the device mounting bracket toward an inside of the support body; and a pinion gear which is rotatably coupled to the inside of the support body and includes a driving pinion engaged with the rack gear and a grip pinion engaged with the grip unit.

The one-touch guide unit may include a one-touch guide which is coupled to one of the support body and the grip unit; and a one-touch path portion which is provided in the other one of the support body and the grip unit to form a path in which the one-touch guide is inserted and moved, and controls the sliding movement state of the grip unit by restricting movement of the one-touch guide in accordance with elasticity of the one-touch elastic member and sliding movement of the grip unit.

The one-touch guide may include a coupling projection which is coupled to one of the support body and the grip unit; a connecting guide formed to be bent in the coupling projection; and a guide projection formed to be bent in the connecting guide and inserted in the one-touch path portion.

The one-touch path portion may include a first reciprocating path portion which is lengthily formed corresponding to a sliding direction of the grip unit; a second reciprocating path portion which is extended from the first reciprocating path portion corresponding to the sliding direction of the grip unit; an insertion restriction path portion which is extended from the second reciprocating path portion and restricts insertion of the grip unit with respect to the support body; a stop path portion which is extended from the insertion restriction path portion and supports the one-touch guide by elasticity of a grip elastic member of the grip unit or the one-touch elastic member; and a returning path which connects the stop path portion and the first reciprocating path portion or connects the stop path portion and the second reciprocating path portion.

BRIEF DESCRIPTION OF THE DRAWINGS

The above and/or other aspects of the present disclosure will become apparent and more readily appreciated from the following description of the exemplary embodiments, taken in conjunction with the accompanying drawings, in which.

DETAILED DESCRIPTION

Figure 1:
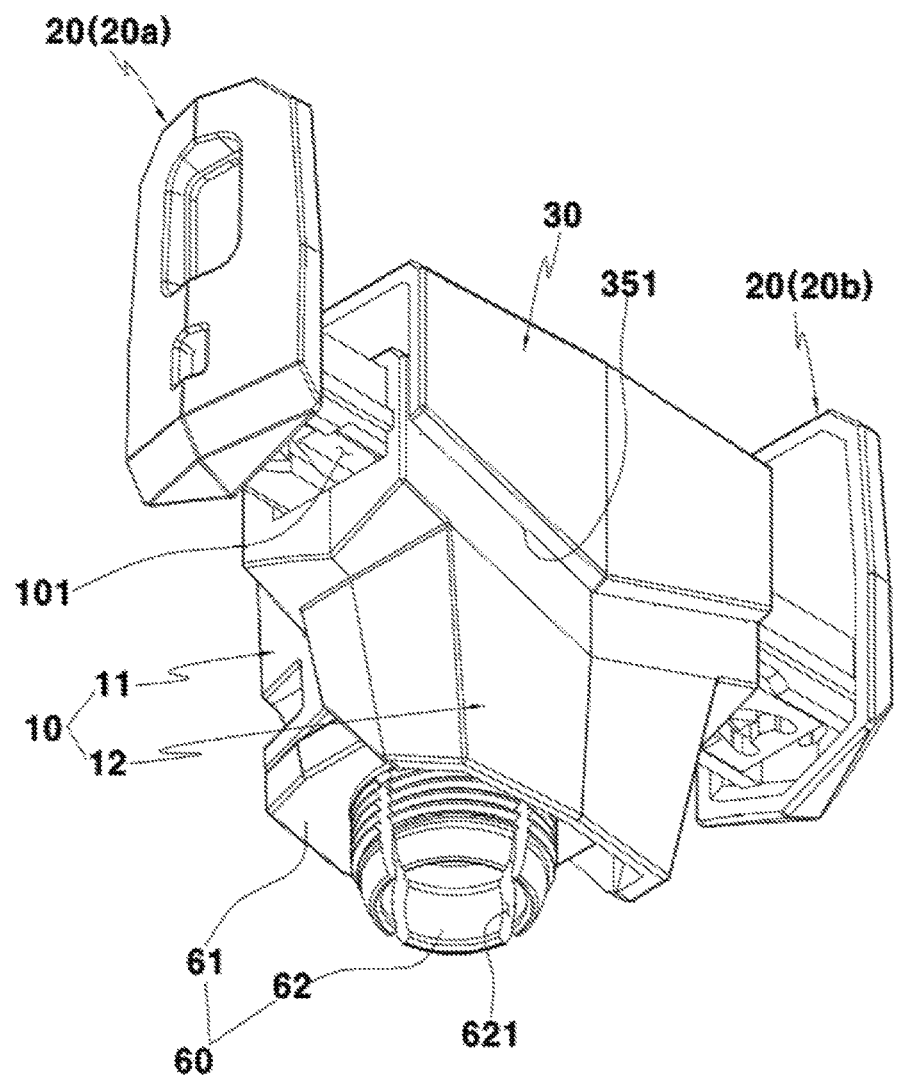
FIGS. 1, 2 and 3 are a perspective view, an exploded perspective view and a lateral view of a one-touch type supporting holder according to one embodiment of the present disclosure, respectively.
Figure 2:
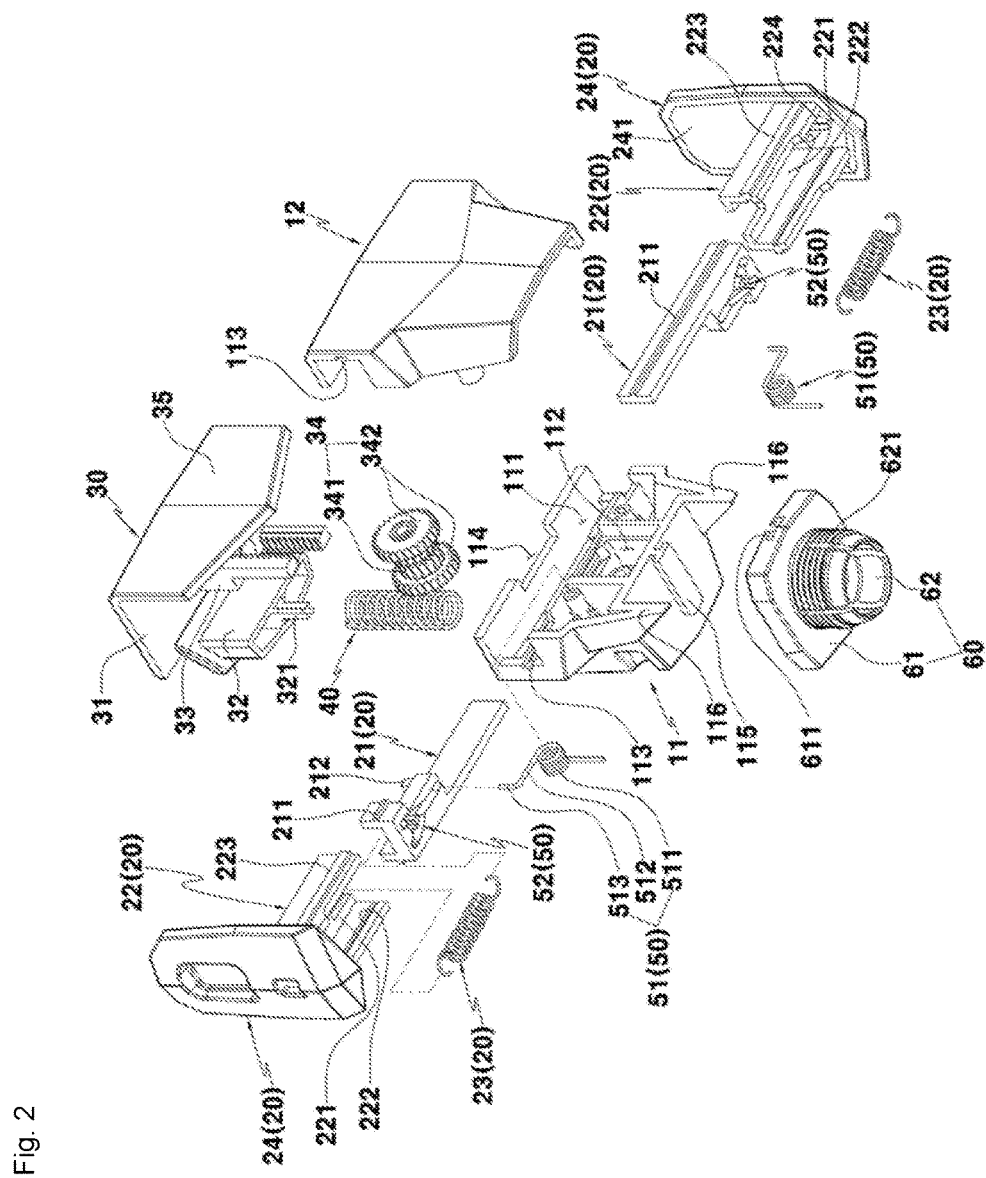
Figure 3:
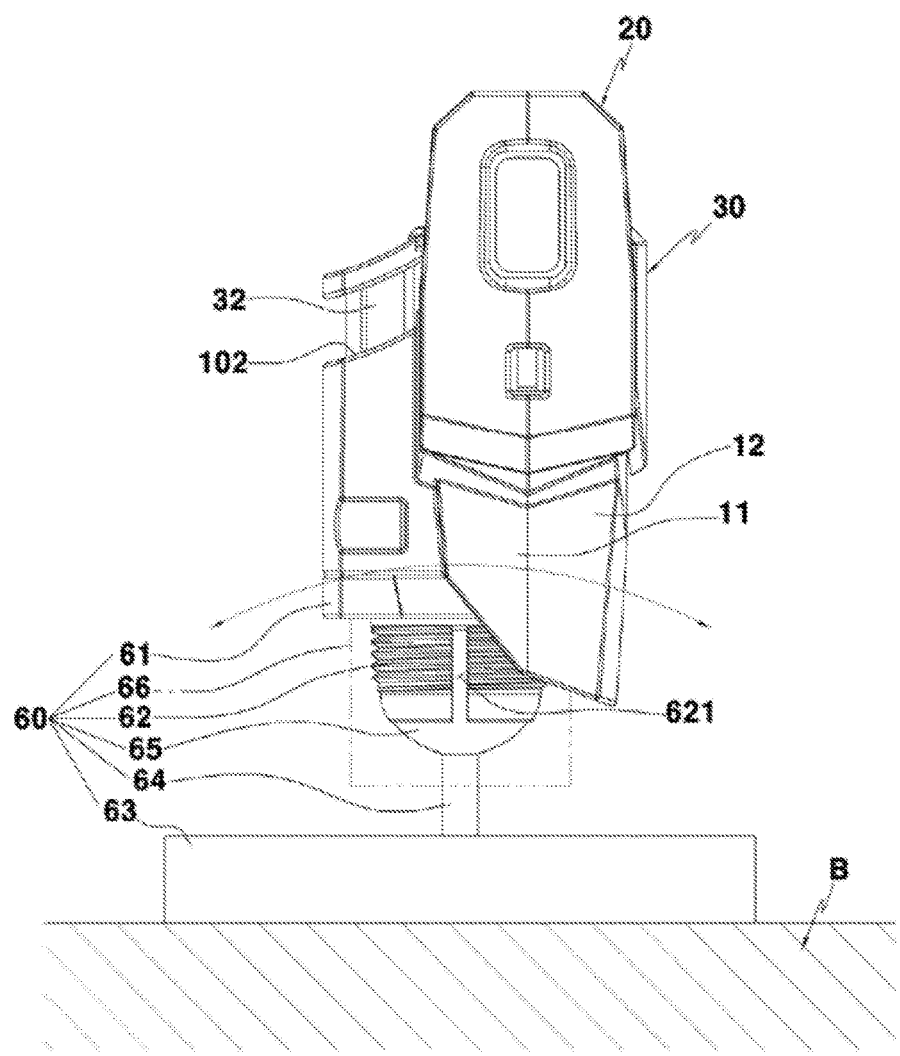
Figure 4:
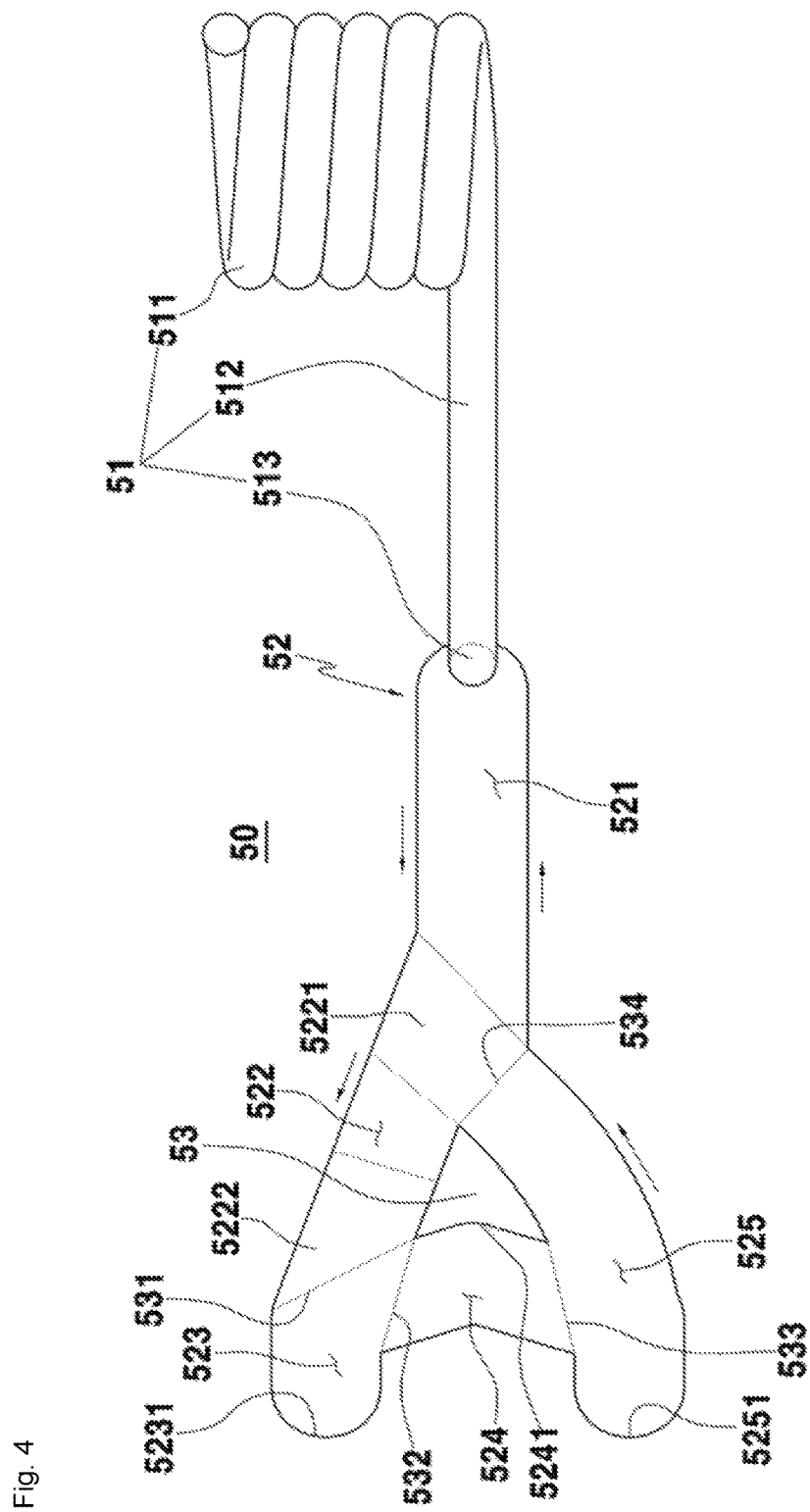
FIG. 4 is a view of showing a one-touch guide unit in the one-touch type supporting holder according to one embodiment of the present disclosure.

Below, embodiments of a one-touch type supporting holder according to the present disclosure will be described in detail with reference to the accompanying drawings. The embodiments are not construed as limiting the present disclosure. Further, detailed descriptions about well-known functions and features may be omitted to avoid clouding the gist of the present disclosure.

Referring to FIG. 1 to FIG. 9, a one-touch type supporting holder according to the present disclosure will be described.

In one embodiment of the present disclosure, directions will be described with reference to the shape of the one-touch type supporting holder. For example, an electronic apparatus EA is mounted to a front of a support body 10, a grip unit 20 slides along leftward and rightward directions of the support body 10, a one-touch reciprocating unit 30 slides along forward and backward directions of the support body 10 while being installed in front of the support body 10, and an elastic support bracket 32 slides along forward and backward directions of the support body 10 while being inserted in an elastic member mount 102. Further, a main body supporting unit 60 slides along upward and downward directions of the support body 10, and is detachably coupled to the support body 10 as a support slider 115 fits on a support sliding groove 611.

The one-touch type supporting holder according to one embodiment of the present disclosure may include the support body 10, one pair of grip units 20, the one-touch reciprocating unit 30, a one-touch elastic member 40, and a one-touch guide unit 50. In an initial state, one pair of grip units 20 are protruding from both lateral sides of the support body 10, and the one-touch reciprocating unit 30 is elastically supported on the support body 10 by the one-touch elastic member 40 while protruding from the front of the support body 10. Further, one pair of grip units 20 are moved sliding in the support body 10 in connection with sliding movement of the one-touch reciprocating unit 30 in the support body 10, so that one pair of grip units 20 can stably grip the electronic apparatus EA mounted to the one-touch reciprocating unit 30.

The support body 10 forms an outer appearance, in which one pair of grip units 20, the one-touch reciprocating unit 30 and the one-touch elastic member 40 are installed. The support body 10 may include a first main body 11, and a second main body 12 coupled to the first main body 11. Each of the grip unit 20 and the one-touch reciprocating unit 30 may be slidably coupled to at least one of the first main body 11 and the second main body 12.

The first main body 11 and the second main body 12 may be detachably coupled to each other by a separate fastening member (not shown). The support body 10 may be formed with one pair of openings 101 opened in opposite directions. One pair of openings 101 are provided at the opposite sides of the support body 10. The opening 101 may be provided in at least one of the first main body 11 and the second main body 12.

The support body 10 may include the elastic member mount 102 on which the one-touch elastic member 40 is elastically supported. The elastic member mount 102 may be recessed in the first main body 11 so as to insert the one-touch elastic member 40 therein. On the bottom of the elastic member mount 102, a second member supporter (not shown) may be provided for supporting the one-touch elastic member 40. The elastic member mount 102 may be provided in at least one of the first main body 11 and the second main body 12.

The support body 10 may be perforated to have a grip sliding portion 111. The grip sliding portion 111 makes one pair of openings 101 communicate with each other. The grip sliding portion 111 forms a sliding movement path for the grip unit 20. The grip sliding portion 111 may be provided in at least one of the first main body 11 and the second main body 12.

The support body 10 may be provided with a gear mount 112. On the gear mount 112, a pinion gear 34 of the one-touch reciprocating unit 30 is rotatably mounted and supported. The gear mount 112 may be recessed from at least one of the first main body 11 and the second main body 12.

The support body 10 may be formed with a grip guide groove 113. The grip guide groove 113 is recessed from the grip sliding portion 111. On the grip guide groove 113, a grip guider provided in the grip unit 20 fits as the grip unit 20 slides and moves. If the grip sliding portion 111 includes the grip guider, the grip unit 20 includes the grip guide groove 113.

The support body 10 may include a rack guide 114. The rack guide 114 forms a path via which a rack gear 33 of the one-touch reciprocating unit 30 slides and moves. The rack guide 114 may be recessed from at least one of the first main body 11 and the second main body 12.

The support body 10 may include the support slider 115. The support slider 115 fits on the support sliding groove 611 of the main body supporting unit 60. If the support slider 115 is provided in the main body supporting unit 60, the support sliding groove 611 is provided in the support body 10. The support slider 115 may be provided in at least one of the first main body 11 and the second main body 12.

The support body 10 may include a support wing 116. The support wing 116 supports the main body supporting unit 60. When the main body supporting unit 60 is coupled to the support body 10, the support wing 116 supports the main body supporting unit 60 against the support body 10, thereby preventing the main body supporting unit 60 from moving in the support body 10 and making the main body supporting unit 60 smoothly slide in the support body 10. The support wing 116 may be provided in at least one of the first main body 11 and the second main body 12.

The grip units 20 are arranged to be pairwise moved in the support body 10. The grip units 20 are respectively inserted in one pair of openings 101 and coupled to the support body 10 so as to be slidably movable in opposite directions. One pair of grip units 20 are arranged at both lateral sides of the support body 10 and slidably movable in the lateral directions of the support body 10. In the initial state, one pair of grip units 20 are provided protruding from the opposite sides of the support body 10.

The grip unit 20 includes a first grip unit 20a slidably movably coupled to one side of the support body 10, and a second grip unit 20b slidably movably coupled to the other side of the support body 10.

The first grip unit 20a is coupled to the support body 10 so as to be slidably movable in a first direction while being inserted in one of one pair of openings 101. The second grip unit 20b is coupled to the support body 10 so as to be slidably movable in a direction opposite to the first direction in connection with sliding movement of the first grip unit 20a while being inserted in the other one of one pair of openings 101.

The grip unit 20 may include a first grip slider 21 on which grip saw-teeth (not shown) are arranged along the sliding direction of the grip unit 20, a second grip slider 22 slidably movably coupled to the first grip slider 21, a grip elastic member 23 elastically supporting the second grip slider 22 against the first grip slider 21, and a grip wing 24 protruding from one end of the second grip slider 22 toward the front of the support body 10. The grip saw-teeth (not shown) is engaged with a grip pinion 342 of the pinion gear 34 of the one-touch reciprocating unit 30.

The first grip slider 21 may be provided with a first grip guider 211. The first grip guider 211 is lengthily formed in the lengthwise direction of the first grip slider 21 and the sliding direction of the first grip slider 21. The first grip guider 211 fits on a unit guide groove 222. The first grip slider 21 may be provided with a first supporter 212. The first supporter 212 couples with one side of the grip elastic member 23.

The second grip slider 22 may be provided with a unit sliding portion 221. The unit sliding portion 221 is recessed from the second grip slider 22 so that the first grip slider 21 can be entirely or partially fitted to the unit sliding portion 221.

The second grip slider 22 may be provided with the unit guide groove 222. The unit guide groove 222 is recessed from the inner circumference of the unit sliding portion 221 so that the first grip guider 211 can be slidably movably fitted to the unit sliding portion 221.

The second grip slider 22 may include a second grip guider 223. The second grip guider 223 may be lengthily formed in the lengthwise direction of the second grip slider 22 and the sliding direction of the second grip slider 22. The second grip guider 223 is slidably movably fitted to the grip guide groove 113.

The second grip slider 22 may include a second supporter 224. The second supporter 224 is provided in the unit sliding portion 221, and couples with the other side of the grip elastic member 23.

Thus, one side of the grip elastic member 23 is connected to the first grip slider 21 via the first supporter 212, and the other side of the grip elastic member 23 is connected to the second grip slider 22 via the second supporter 224. The grip elastic member 23 maintains the fitted coupling between the first grip slider 21 and the second grip slider 22.

The grip wing 24 may include a grip cushion 241. The grip cushion 241 has elasticity and is coupled to the grip wing 24. When the grip wing 24 grips the electronic apparatus EA, the grip cushion 241 elastically supports the electronic apparatus EA, thereby relieving a shock transferred to the electronic apparatus EA and enhancing a grip on the electronic apparatus EA. According to one embodiment of the present disclosure, the first grip slider 21 fits on the unit sliding portion 221 formed in the second grip slider 22. In this case, the grip unit 20 may be provided with the grip guider to fit on the grip guide groove 113. The grip guider may protrude from the outer surface of the first grip slider 21 or the second grip slider 22 in accordance with coupling between the first grip slider 21 and the second grip slider 22.

According to one embodiment of the present disclosure, the grip guider may be materialized by the second grip guider 223 as the first grip slider 21 fits on the unit sliding portion 221 formed in the second grip slider 22.

Although it is not illustrated, if the unit sliding portion 221 is formed in the first grip slider 21, the second grip slider 22 may fits on the unit sliding portion 221 formed in the first grip slider 21. The grip guider may be materialized by the first grip guider 211.

The one-touch reciprocating unit 30 is slidably movably coupled to the front of the support body 10. The one-touch reciprocating unit 30 is protruding from the front of the support body 10. The one-touch reciprocating unit 30 makes the grip unit 20 slide and move while sliding and moving on the support body 10 in order to mount the electronic apparatus EA. For example, the one-touch reciprocating unit 30 slides and moves on the support body 10 by external force transferred as the electronic apparatus EA is mounted, thereby making the grip unit 20 slide and move.

The one-touch reciprocating unit 30 may include a device mounting bracket 31 arranged in the front of the support body 10 so that the electronic apparatus EA can be mounted, the elastic support bracket 32 coupled to the device mounting bracket 31 and elastically supporting the one-touch elastic member 40, the rack gear 33 protruding from the device mounting bracket 31 toward the inside of the support body 10, and the pinion gear 34 rotatably coupled to the inside of the support body 10.

Further, the one-touch reciprocating unit 30 may further include a movement preventing bracket 35 coupled to the device mounting bracket 31 and supported at one side of the support body 10 while being arranged to face the elastic support bracket 32. The device mounting bracket 31 may be provided with a mounting cushion (not shown) for elastically supporting the electronic apparatus EA when the electronic apparatus EA is mounted. The elastic support bracket 32 may be provided with a supporting projection 321 for supporting one side of the one-touch elastic member 40.

The rack gear 33 includes rack saw-teeth arranged to be engaged with the pinion gear 34. The rack saw-teeth are arranged in the lengthwise direction of the rack gear 33 and the sliding direction of the rack gear 33. The pinion gear 34 may include a driving pinion 341 to be engaged with the rack gear 33, and the grip pinion 342 to be engaged with the grip unit 20. The pinion gear 34 may be rotatable around a pinion shaft in the support body 10. The driving pinion 341 is formed with driving pinion saw-teeth, and the grip pinion 342 is formed with grip pinion saw-teeth. Each of the pinion saw-teeth is arranged on the outer circumference of the pinion gear 34.

Here, the driving pinion 341 and the grip pinion 342 are different in diameter, thereby making a sliding distance of the one-touch reciprocating unit 30 be different from a sliding distance of the grip unit 20. According to one embodiment of the present disclosure, the diameter of the driving pinion 341 is smaller than the diameter of the grip pinion 342, and therefore the sliding distance of the grip unit 20 is relatively long even though the sliding distance of the one-touch reciprocating unit 30 is short, thereby diversifying change in the grip unit 20, and enhancing a grip of the grip unit 20 on the electronic apparatus EA.

The movement preventing bracket 35 may be formed with a movement preventing projection 351. The movement preventing projection 351 protrudes from the movement preventing bracket 35 toward the support body 10, thereby minimizing a contact area between the movement preventing bracket 35 and the support body 10 and allowing the one-touch reciprocating unit 30 to stably slide on the support body 10.

The one-touch elastic member 40 elastically supports the one-touch reciprocating unit 30 against the support body 10. The one-touch elastic member 40 is inserted in and supported on the elastic member mount 102, and elastically supports the elastic support bracket 32 against the bottom of the elastic member mount 102. One side of the one-touch elastic member 40 is supported on the first member supporter protruding or recessed from the elastic support bracket 32, and the other side of the one-touch elastic member 40 is supported on a second member supporter (not shown) protruding or recessed from the bottom of the elastic member mount 102. In the one-touch type supporting holder according to one embodiment of the present disclosure, the first member supporter may be materialized by the supporting projection 321 protruding from the elastic support bracket 32.

The one-touch guide unit 50 controls the sliding movement of the grip unit 20 in the support body 10. The one-touch guide units 50 form a pair corresponding to one pair of grip units 20. The one-touch guide unit 50 may include a one-touch guide 51, and the one-touch path portion 52. The one-touch guide 51 is coupled to one of the support body 10 and the grip unit 20. According to one embodiment of the present disclosure, the one-touch guide 51 is coupled to the first main body 11 of the support body 10.

The one-touch guide 51 may include a coupling projection 511 coupled to one of the support body 10 and the grip unit 20, a connecting guide 512 bent from the coupling projection 511, and a guide projection 513 bent from the connecting guide 512 and inserted in the one-touch path portion 52. In this case, the connecting guide 512 is elastically supported on the coupling projection 511 and thus keeps the guide projection 513 being supported on the bottom of the one-touch path portion 52.

Alternatively, the one-touch guide 51 may include the coupling projection 511 coupled to one of the support body 10 and the grip unit 20, and the guide projection 513 extended from the coupling projection 511 and inserted in the one-touch path portion 52. Like this, the connecting guide 512 may be omitted.

In this case, the coupling projection 511 may have elasticity to keep the guide projection 513 being inserted in the one-touch path portion 52. With the elasticity of the coupling projection 511, the guide projection 513 is stably supported on the bottom of the one-touch path portion 52. Thus, the one-touch guide 51 keeps being inserted in the one-touch path portion 52, and the guide projection 513 keeps being supported on the bottom of the one-touch path portion 52.

The one-touch path portion 52 is provided in the other one of the support body 10 and the grip unit 20. The one-touch path portion 52 is configured to form a moving path of the one-touch guide 51 in a state that the one-touch guide 51 is inserted therein. The one-touch path portion 52 restricts movement of the one-touch guide 51 in accordance with the sliding movement of the grip unit 20, the elasticity of the grip elastic member 23, the sliding movement of the one-touch reciprocating unit 30 and the elasticity of the one-touch elastic member 40, thereby controlling the grip unit 20 to protrude from or be inserted in the support body 10. The control of the grip unit 20 to protrude from or be inserted in the support body 10 is clearly achieved by an interaction among the grip unit 20, the one-touch reciprocating unit 30 and the one-touch guide unit 50.

The one-touch path portion 52 may include a first reciprocating path portion 521, a second reciprocating path portion 522, an insertion restriction path portion 523, a stop path portion 524, and a returning path 525. The first reciprocating path portion 521 is lengthily formed corresponding to the sliding direction of the grip unit 20. The second reciprocating path portion 522 is extended from the first reciprocating path portion 521 corresponding to the sliding direction of the grip unit 20. Thus, the guide projection 513 of the one-touch guide 51 can freely slide along the first reciprocating path portion 521 and the second reciprocating path portion 522 in accordance with the sliding movement of the grip unit 20.

The second reciprocating path portion 522 may include a first inclined portion 5221 inclined corresponding to a level difference between the first reciprocating path portion 521 and the second reciprocating path portion 522. The first inclined portion 5221 allows the guide projection 513 of the one-touch guide 51 to move back toward the first reciprocating path portion 521 even though there is the level difference between the first reciprocating path portion 521 and the second reciprocating path portion 522. Thus, the grip unit 20 freely slides in the first reciprocating path portion 521 and the second reciprocating path portion 522, and therefore the supporting holder is convenient to select whether to mount or separate the electronic apparatus EA.

Further, the second reciprocating path portion 522 may include a second inclined portion 5222 inclined corresponding to a level difference between the second reciprocating path portion 522 and the insertion restriction path portion 523. The second inclined portion 5222 is configured to form the level difference between the second reciprocating path portion 522 and the insertion restriction path portion 523, and prevents the guide projection 513 of the one-touch guide 51 from moving back from the insertion restriction path portion 523 toward the second reciprocating path portion 522.

The insertion restriction path portion 523 is extended from the second reciprocating path portion 522 and restricts the insertion of the grip unit 20 with respect to the support body 10. If the guide projection 513 of the one-touch guide 51 enters the insertion restriction path portion 523, the guide projection 513 is prevented from moving back toward the second reciprocating path portion 522. The insertion restriction path portion 523 includes a first insertion restriction groove 5231 for restricting the guide projection 513 of the one-touch guide 51 not to slide by external force.

The stop path portion 524 is extended from the insertion restriction path portion 523 and supports the guide projection 513 of the one-touch guide 51 by the elasticity of the one-touch elastic member and the elasticity of the grip elastic member 23. If the guide projection 513 of the one-touch guide 51 enters the stop path portion 524, the guide projection 513 is prevented from moving back toward the insertion restriction path portion 523. The stop path portion 524 includes a stop groove 5241 in which the guide projection 513 of the one-touch guide 51 is inserted by the elasticity of the one-touch elastic member and the elasticity of the grip elastic member 23.

The returning path 525 is extended from the stop path portion 524 and connected to the first reciprocating path portion 521 or the second reciprocating path portion 522. In other words, the returning path 525 connects the stop path portion 524 and the first reciprocating path portion 521, or connects the stop path portion 524 and the second reciprocating path portion 522. If the guide projection 513 of the one-touch guide 51 enters the first reciprocating path portion 521 or the second reciprocating path portion 522, the guide projection 513 is prevented from moving back toward the returning path 525. The returning path 525 includes a second insertion restriction groove 5251 for restricting the guide projection 513 of the one-touch guide 51 not to slide by external force.

Thus, the second reciprocating path portion 522, the stop path portion 524 and the returning path 525 are formed to surround a one-touch circulation block 53 on the one-touch path portion 52, and the stop groove 5241 is recessed from the one-touch circulation block 53.

There are no limits to the depth of first reciprocating path portion 521 and the second reciprocating path portion 522 so that the guide projection 513 can freely slide. However, the depth of the insertion restriction path portion 523 in the vicinity of a place where the second reciprocating path portion 522 meets the insertion restriction path portion 523 is greater than the depth of the second reciprocating path portion 522 or the depth at the end of the second reciprocating path portion 522, thereby preventing the guide projection 513 from moving backward.

Further, the depth of the stop path portion 524 in the vicinity of a place where the insertion restriction path portion 523 meets the stop path portion 524 is greater than the depth of the insertion restriction path portion 523, thereby preventing the guide projection 513 from moving backward. Further, the depth of the returning path 525 in a place where the returning path 525 meets the stop path portion 524 is greater than the depth of the stop path portion 524, thereby preventing the guide projection 513 from moving backward.

Further, the depth of the first reciprocating path portion 521 of the depth of the second reciprocating path portion 522 in a place where the returning path 525 meets the first reciprocating path portion 521 or the returning path 525 meets the second reciprocating path portion 522 is greater than the depth of the returning path 525, thereby preventing the guide projection 513 from moving backward.

Although it is not illustrated, the bottom of each path portion may be inclined upward or downward corresponding to the level difference. Further, the bottom of each path portion may be flat corresponding to the level difference.

The one-touch guide unit 50 may further include at least one of a first backward-movement preventing portion 531, a second backward-movement preventing portion 532, a third backward-movement preventing portion 533, and a fourth backward-movement preventing portion 534.

The first backward-movement preventing portion 531 prevents backward movement from the insertion restriction path portion 523 toward the second reciprocating path portion 522. The first backward-movement preventing portion 531 may be materialized by a level difference at a place where the second reciprocating path portion 522 meets the insertion restriction path portion 523.

The second backward-movement preventing portion 532 prevents backward movement from the stop path portion 524 toward the insertion restriction path portion 523. The second backward-movement preventing portion 532 may be materialized by a level difference at a place where the insertion restriction path portion 523 meets the stop path portion 524.

The third backward-movement preventing portion 533 prevents backward movement from the returning path 525 toward the stop path portion 524. The third backward-movement preventing portion may be materialized by a level difference at a place where the stop path portion meets the returning path.

The fourth backward-movement preventing portion 534 prevents the backward movement from the first reciprocating path portion 521 or the second reciprocating path portion 522 toward the returning path 525. The fourth backward-movement preventing portion 534 may be materialized by a level difference at a place where the returning path 525 meets the first reciprocating path portion 521 or a level difference at a place where the returning path 525 meets the second reciprocating path portion 522.

The one-touch type supporting holder according to one embodiment of the present disclosure may further include the main body supporting unit 60. The main body supporting unit 60 couples the support body 10 with a base B provided at an installation place. The main body supporting unit 60 may include a main body supporter 61 detachably coupled to the support body 10, and a ball mount bracket 62 provided in the main body supporter 61, and may further include an installation bracket 63 coupled to the base B, and a coupling ball 65 provided in the installation bracket 63 and fitted to the ball mount bracket 62.

The main body supporter 61 is coupled to a back of the support body 10. The main body supporter 61 is formed with the support sliding groove 611 recessed therefrom. The support sliding groove 611 fits on the support slider 115 formed in the support body 10.

For example, the main body supporter 61 maintains coupling with the first main body 11 by the second main body 12. If the main body supporter 61 is coupled to the first main body 11 by the fitted coupling between the support slider 115 and the support sliding groove 611, and the first main body 11 and the second main body 12 are coupled, a part of the second main body 12 supports the main body supporter 61, so that the second main body 12 can maintain coupling with the main body supporter 61 in the first main body 11.

The main body supporting unit 60 includes a detachable cap 66 for holding the coupling ball 65 within the ball mount bracket 62, and the detachable cap 66 is screw-coupled to the ball mount bracket 62 so that the ball mount bracket 62 can elastically press the coupling ball 65, thereby locking the coupling ball 65 to the ball mount bracket 62.

Although it is not illustrated, there may be further provided a holding unit (not shown) slidably movably coupled to the support body 10 in a direction of intersecting the sliding direction of the grip unit 20 and the sliding direction of the one-touch reciprocating unit 30. Thus, the holding unit (not shown) can support the bottom or top of the electronic apparatus EA gripped by the grip unit 20.

With the one-touch type supporting holder according to one embodiment of the present disclosure, operations of gripping and releasing the electronic apparatus EA by one touch will be described below.

Figure 5:
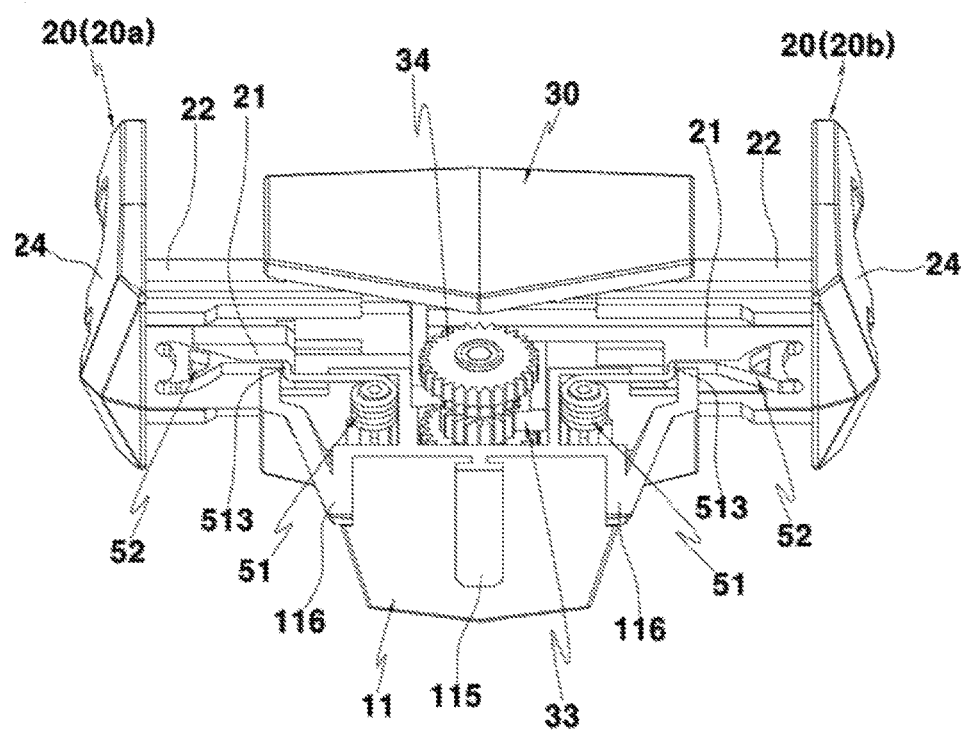
FIG. 5 is a view of showing an initial state of the one-touch type supporting holder according to one embodiment of the present disclosure.

In the initial state where the support body 10 is not subjected to external force for one touch, as shown in FIG. 5, one pair of grip units 20 are protruding from the both lateral sides of the support body 10, and the one-touch reciprocating unit 30 protrudes from the front of the support body 10.

The electronic apparatus EA is mounted to the device mounting bracket 31 of the one-touch reciprocating unit 30 in front of the support body 10, and then pressed toward the back of the support body 10. Then, the rack gear 33 moves toward the back of the support body 10 as it is engaged with the pinion gear 34, and one pair of grip units 20 engaged with the pinion gear 34 are inserted in the support body 10 as the pinion gear 34 rotates.

In this case, the guide projection 513 moves toward the second reciprocating path portion 522 via the first reciprocating path portion 521. Here, the first grip slider 21 and the second grip slider 22 slide and move into the support body 10 while maintaining coupling with each other by the grip elastic member 23.

Figure 6:
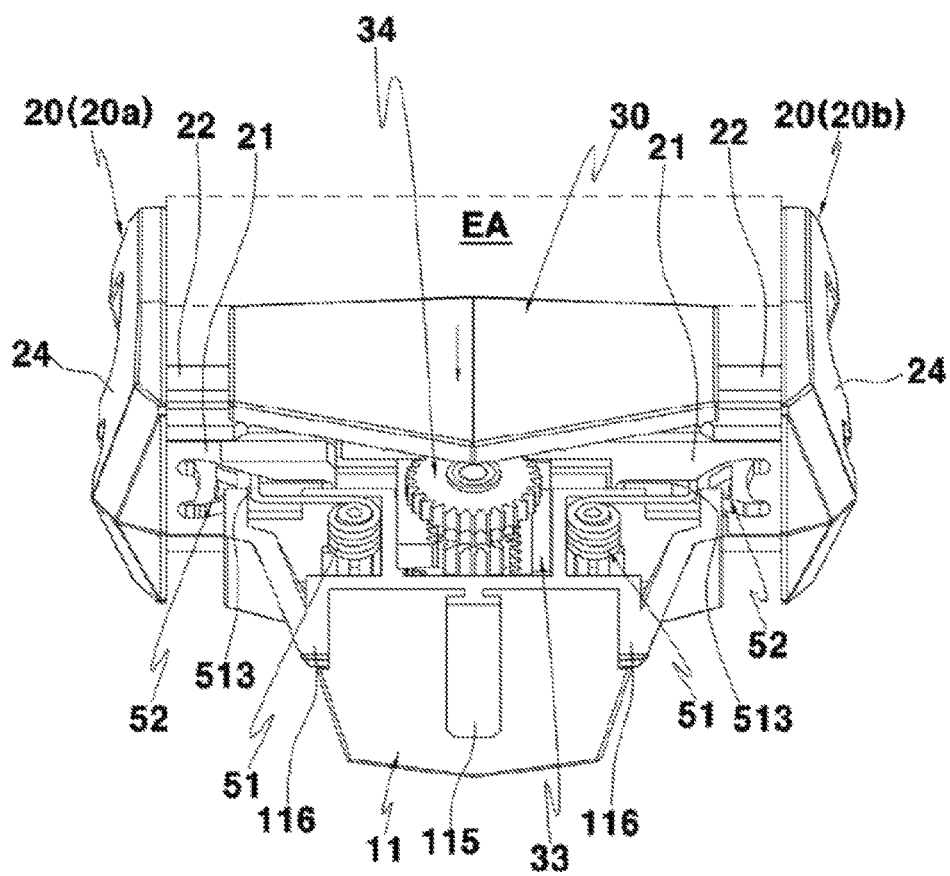
FIGS. 6, 7 and 8 are views of showing a first operation state, a second operation state and a third operation state for gripping an electronic apparatus in the one-touch type supporting holder according to one embodiment of the present disclosure, respectively.

Subsequently, if the electronic apparatus EA is pressed toward the back of the support body 10, the grip wing 24 grips both lateral sides of the electronic apparatus EA as shown in FIG. 6, by an interaction between the one-touch reciprocating unit 30 and the grip unit 20.

In this case, the guide projection 513 is positioned in at least one of the first reciprocating path portion 521 and the second reciprocating path portion 522. Here, as shown in (a) of FIG. 9, the first grip slider 21 and the second grip slider 22 maintain coupling with each other via the grip elastic member 23. Further, the first grip slider 21 is not separated from the grip wing 24, and maintains the initial coupling state.

Figure 7:
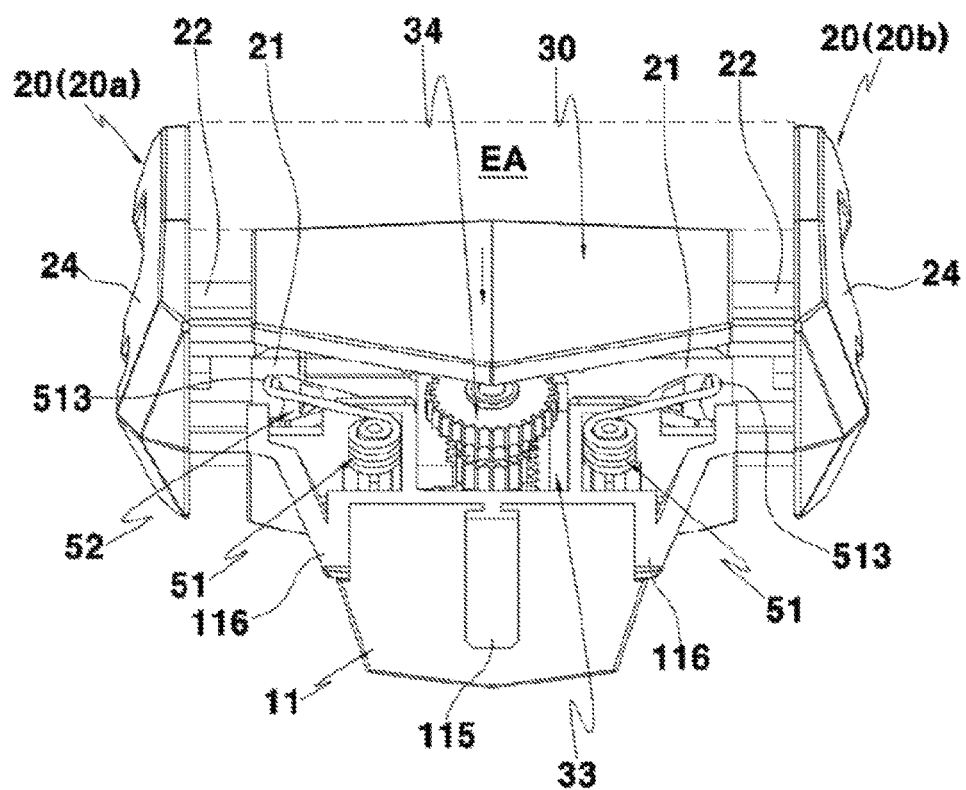

Then, as shown in FIG. 7, if the electronic apparatus EA is further pressed toward the back of the support body 10, the grip wing 24 maintains gripping both lateral sides of the electronic apparatus EA by an interaction between the one-touch reciprocating unit 30 and the grip unit 20, and only the first grip slider 21 is inserted into the support body 10.

In this case, the guide projection 513 moves to the insertion restriction path portion 523 via the second reciprocating path portion 522, and fits on the first insertion restriction groove 5231. Here, the grip elastic member 23 is being stretched as shown in (b) of FIG. 9, and therefore the grip wing 24 maintains gripping both lateral sides of the electronic apparatus EA. Further, the first grip slider 21 is maximally distant from the grip wing 24, thereby increasing the elasticity of the grip elastic member 23.

Figure 8:
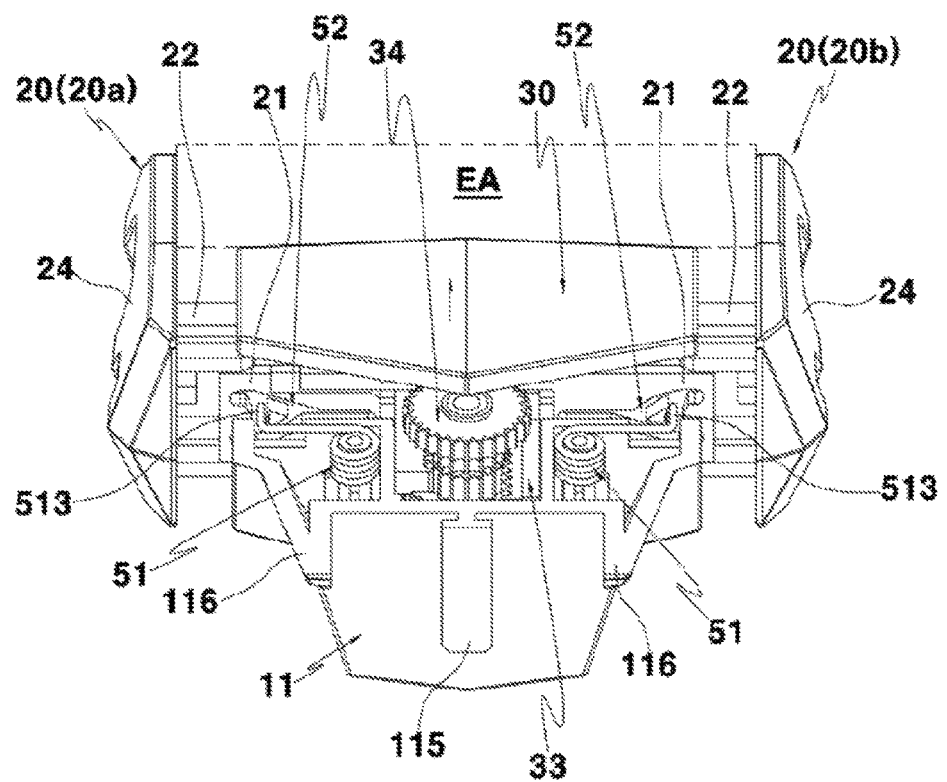

Last, if the external force applied to the electronic apparatus EA is released, as shown in FIG. 8, the grip wing 24 maintains gripping both lateral sides of the electronic apparatus EA by an interaction between the one-touch reciprocating unit 30 and the grip unit 20, and the first grip slider 21 is a little moved in an outward direction of the support body 10.

In this case, the guide projection 513 moves to the stop path portion 524 via the insertion restriction path portion 523, and fits on the stop groove 5241. Here, the grip elastic member 23 is being stretched as shown in (c) of FIG. 9, so that the grip wing 24 can stably grip both lateral sides of the electronic apparatus EA by the elasticity of the grip elastic member 23, and the guide projection 513 can maintain stably fitting on the stop groove 5241.

Next, if the electronic apparatus EA is pressed toward the back of the support body 10 in order to release the electronic apparatus EA, only the first grip slider 21 moves to and is inserted in the support body 10 in the state that the grip wing 24 grips both lateral sides of the electronic apparatus EA by an interaction between the one-touch reciprocating unit 30 and the grip unit 20.

In this case, the guide projection 513 moves to the returning path 525 via the stop path portion 524, and fits on the second insertion restriction groove 5251. Here, the grip elastic member 23 is stretched as shown in (b) of FIG. 9.

Then, the electronic apparatus EA is further released from the pressure, the one-touch reciprocating unit 30 slides and moves toward the front of the support body 10 by the elasticity of the one-touch elastic member 40, and therefore the grip units 20 are protruding from both lateral sides of the support body 10.

Figure 9:
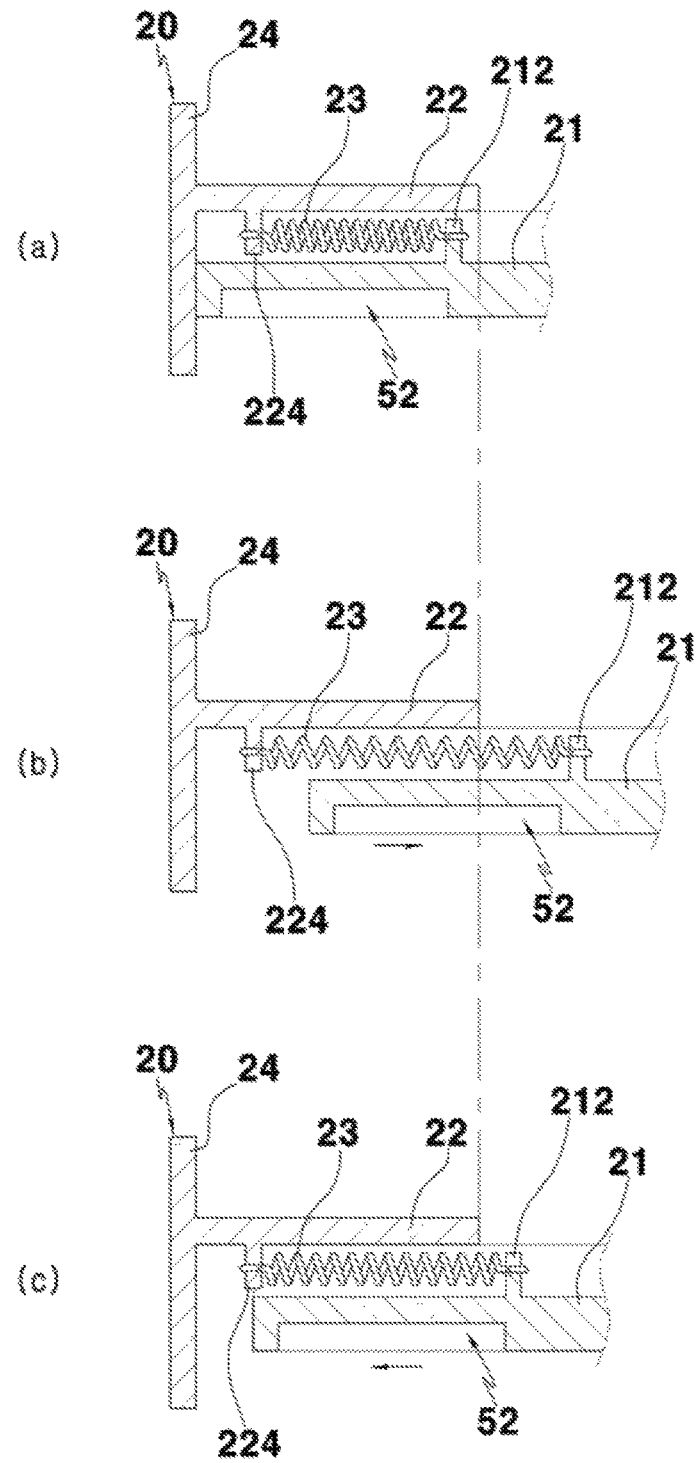
FIG. 9 is a view of showing states of a grip unit corresponding to the operation states of FIGS. 6 to 8 in the one-touch type supporting holder according to one embodiment of the present disclosure.

Next, the first grip slider 21 slides and moves toward the grip wing 24 as show in (a) of FIG. 9, and the grip wing 24 is separated from the electronic apparatus EA, thereby returning the grip units 20 to the initial state. Thus, the electronic apparatus EA is separated from the one-touch type supporting holder according to one embodiment of the present disclosure.

As described above, according to the electronic apparatus, the one-touch type supporting holder is not only in a standby state for gripping an electronic apparatus but also convenient to hold the electronic apparatus by one touch.

Further, according to the present disclosure, the grip unit slides and moves by one touch in connection with the one-touch reciprocating unit sliding and moving in the support body, thereby easily gripping the electronic apparatus and returning to the initial state, where one pair of grip units are opened, by the elasticity of the one-touch elastic member.

Although a few exemplary embodiments of the present disclosure have been shown and described, these are for illustrative purpose only and it will be appreciated by those skilled in the art that changes may be made in these embodiments without departing from the principles and spirit of the invention, the scope of which is defined in the appended claims and their equivalents.

<Reference Numerals>

| | | |
|---|---|---|
| 10: support body | 11: first main body | 12: second main body |
| 101: opening | 102: elastic member mount | |
| 111: grip sliding portion | | |
| 112: gear mount | 113: grip guide groove | 114: rack guide |
| 115: support slider | 116: support wing | 20: grip unit |
| 20a: first grip unit | 20b: second grip unit | 21: first grip slider |
| 211: first grip guider | 212: first supporter | |
| 22: second grip slider | | |
| 221: unit sliding portion | 222: unit guide groove | |
| 223: second grip guider | | |
| 224: second supporter | 23: grip elastic member | |
| 24: grip wing | | |
| 241: grip cushion | 30: one-touch reciprocating unit | |
| 31: device mounting bracket | | |
| 32: elastic support bracket | | |
| 321: supporting projection | | |
| 33: rack gear | | |
| 34: pinion gear | 341: driving pinion | 342: grip pinion |
| 35: movement preventing bracket | | |
| 351: movement preventing projection | | |
| 40: one-touch elastic member | | |
| 50: one-touch guide unit | | |
| 51: one-touch guide | 511: coupling projection | |
| 512: connecting guide | 513: guide projection | |
| 52: one-touch path portion | | |
| 521: first reciprocating path portion | | |
| 522: second reciprocating path portion | | |

| <Reference Numerals> | |
|---|---|
| 5221: first inclined portion | |
| 5222: second inclined portion | |
| 523: insertion restriction path portion | |
| 5231: first insertion restriction groove | |
| 524: stop path portion | 5241: stop groove |
| 525: returning path | |
| 5251: second insertion restriction groove | |
| 531: first backward-movement preventing portion | |
| 532: second backward-movement preventing portion | |
| 533: third backward-movement preventing portion | |
| 534: fourth backward-movement preventing portion | |
| 53: one-touch circulation block | |
| 60: main body supporting unit | |
| 61: main body supporter | 611: support sliding groove |
| 62: ball mount bracket | 621: mounting slit |
| 63: installation bracket | |
| 64: extension rod | 65: coupling ball |
| 66: detachable cap | |
| EA: electronic apparatus | B: base |

What is claimed is:

1. A one-touch type supporting holder comprising:
a support body which comprises one pair of openings opened in directions opposite to each other;
one pair of grip units which are respectively inserted in the one pair of openings and slidably movably coupled to the support body in directions opposite to each other;
an one-touch reciprocating unit which is slidably movably coupled to a front of the support body, and configured to slide and move vertically in the support body, thereby making the grip units to slide and move horizontally to mount the electronic apparatus;
an one-touch elastic member which elastically supports the one-touch reciprocating unit against the support body; and
one pair of one-touch guide units configured to control a sliding movement state in a horizontal direction of the grip units in the support body,
wherein each of the one-touch guide units comprises:
an one-touch guide which is coupled to one of the support body and the grip unit; and
an one-touch path portion which is provided in the other one of the support body and the grip unit to form a path in which the one-touch guide is inserted and moved, and controls the sliding movement state of the grip unit by restricting movement of the one-touch guide in accordance with elasticity of the one-touch elastic member and sliding movement of the grip unit,
wherein the one-touch guide comprises:
a coupling projection which is coupled to one of the support body and the grip unit;
a connecting guide formed to be bent in the coupling projection; and
a guide projection formed to be bent in the connecting guide and inserted in the one-touch path portion,
wherein the one-touch path portion comprises:
a first reciprocating path portion which is lengthily formed corresponding to a sliding direction of the grip unit;
a second reciprocating path portion which is extended from the first reciprocating path portion corresponding to the sliding direction of the grip unit;
an insertion restriction path portion which is extended from the second reciprocating path portion and restricts insertion of the grip unit with respect to the support body;
a stop path portion which is extended from the insertion restriction path portion and supports the one-touch guide by elasticity of a grip elastic member of the grip unit or the one-touch elastic member; and
a returning path which connects the stop path portion and the first reciprocating path portion or connects the stop path portion and the second reciprocating path portion.

2. The one-touch type supporting holder according to claim 1, wherein the grip unit comprises a first grip slider on which grip saw-teeth are arranged along a sliding direction of the grip unit; a second grip slider which is slidably movably coupled to the first grip slider; a grip elastic member which elastically supports the second grip slider against the first grip slider; and a grip wing which protrudes from one end portion of the second grip slider toward the front of the support body, and one of the first grip slider and the second grip slider is slidably movably coupled to the support body.

3. The one-touch type supporting holder according to claim 1, wherein the one-touch reciprocating unit comprises a device mounting bracket which is arranged in the front of the support body and mounts the electronic apparatus thereto; an elastic support bracket which is coupled to the device mounting bracket and elastically supports the one-touch elastic member; a rack gear which protrudes from the device mounting bracket toward an inside of the support body; and a pinion gear which is rotatably coupled to the inside of the support body and comprises a driving pinion engaged with the rack gear and a grip pinion engaged with the grip unit.

* * * * *